Oct. 27, 1953  A. HOPKIN, JR  2,657,293
AUTOMOTIVE SIGNAL LIGHT CONTROL SWITCH
Filed May 24, 1950  5 Sheets-Sheet 1

INVENTOR.
ALFRED HOPKIN JR.
BY
Busser & Harding
ATTORNEYS.

Oct. 27, 1953

A. HOPKIN, JR 2,657,293

AUTOMOTIVE SIGNAL LIGHT CONTROL SWITCH

Filed May 24, 1950

INVENTOR.
ALFRED HOPKIN JR.
BY
Bussert Harding
ATTORNEYS.

Oct. 27, 1953 A. HOPKIN, JR 2,657,293
AUTOMOTIVE SIGNAL LIGHT CONTROL SWITCH
Filed May 24, 1950 5 Sheets-Sheet 3

INVENTOR.
ALFRED HOPKIN JR.
BY
*Bussery Harding*
ATTORNEYS.

Oct. 27, 1953 A. HOPKIN, JR 2,657,293
AUTOMOTIVE SIGNAL LIGHT CONTROL SWITCH
Filed May 24, 1950

INVENTOR.
ALFRED HOPKIN JR.
BY Busser + Harding
ATTORNEYS.

Patented Oct. 27, 1953

2,657,293

UNITED STATES PATENT OFFICE 2,657,293

AUTOMOTIVE SIGNAL LIGHT CONTROL SWITCH

Alfred Hopkin, Jr., Philadelphia, Pa., assignor to Arrow Safety Device Company, Mount Holly, N. J., a corporation of New Jersey Application May 24, 1950, Serial No. 163,988

14 Claims. (Cl. 200—122)

1

This invention relates to a control switch assembly and signal system employed for controlling turn and stop light signals such as are commonly used on motor vehicles. The switch assembly may be mounted on the steering column and operated by the driver of the motor vehicle. The switch assembly provides a control for the signal lights and also provides an indication to the driver of improper operation of the signal system.

This invention relates to an improvement of the signal switch assembly disclosed in the co-pending Thomas F. Young application Serial No. 81,669, filed March 16, 1949.

It is an object of this invention to provide a control switch of simple, economical and practical construction which may be mounted on the steering column of a motor vehicle and manually operated by the driver to control turn signal lights and which provides a pilot light which will indicate to the driver the existence of a failure in the turn and stop light signal system.

It is a further object of this invention to provide a control switch assembly which will automatically return to a neutral position after the expiration of a predetermined period of time after the operation thereof.

It is another object of this invention to provide a control switch assembly which will automatically return to a neutral position after the expiration of a predetermined period of time after the operation thereof and in which the predetermined period may be extended when desired.

It is another object of this invention to provide a control switch assembly which after being manually moved to an operating position will be latched in that position and automatically released from that position after a predetermined period of time by the operation of a thermal element.

It is another object of this invention to provide a control switch assembly which after being manually positioned in one of its operating positions will be latched in that position and will be released from that position after a predetermined period of time by the operation of a thermal element, and which may immediately thereafter be latched into the other of its operating positions when manually moved into that position and which after the expiration of a predetermined period of time will be released therefrom by the operation of a second thermal element.

These and other objects of the invention will become apparent from the following description when read in conjunction with the accompanying drawings, in which.

2

Referring to Figures 1-5 there is shown a stamped metal switch case 4 which is attached by the use of four screws 6, to a stamped metal switch case bottom member 8. Affixed to the bottom member 8 are the bracket members 10 supporting the switch assembly base plate 12. The base plate 12 is made of a resin impregnated fibre or other suitable insulating material and provides a mounting plate for the switch parts as will be hereinafter described.

Figure 1:
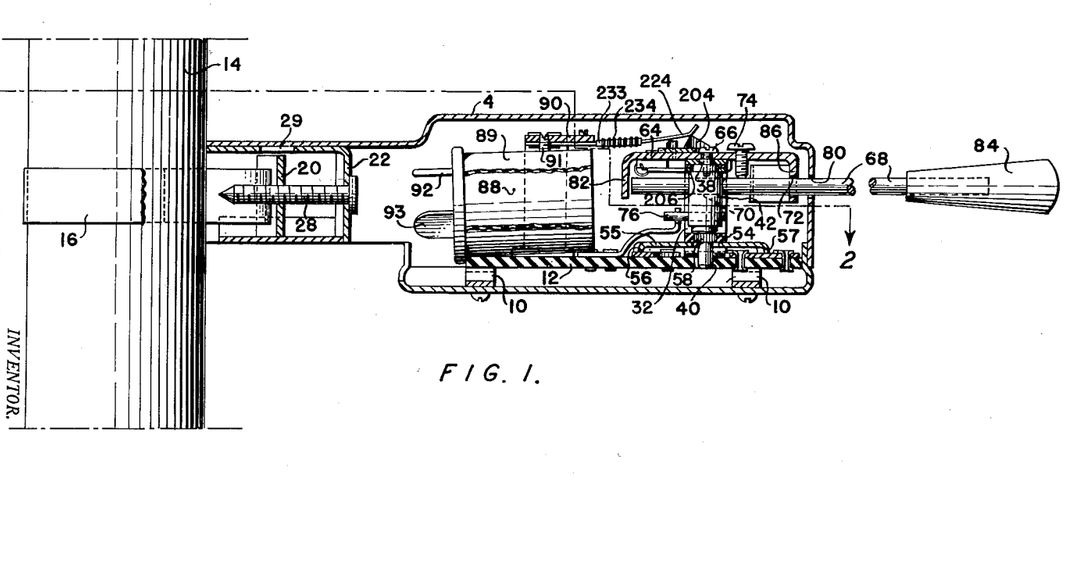
Figure 1 is an elevation of the switch assembly mounted on a steering column showing the case, the switch means and the mounting means in section.

The switch case is mounted on the steering column 14 by means of the steel strap 16 which is passed around the steering column, through slots 18 in the channel member 20 and is folded back in itself so that the ends 17 of the strap lay over the strap 16 against the steering column. The member 22 is a box-like member having an open end 24 adjacent to the steering column 14. The edges 26 of the open end of the box are brought to bear firmly against the strap 16 and the folded back ends 17 by the action of the head of the screw 28. The screw 28 passes freely through the member 22 and the head of the screw rests upon member 22. The screw is threaded into the member 20. Thus, turning the screw draws the member 20 back into the box member 22 away from the steering column, pulling the strap tightly around the steering column, clamping the strap 16 and the ends thereof 17 firmly between the edges 26 of the box member 22 and the steering column thereby rigidly mounting the box member 22 against the steering column. The hole 29 in the side of member 22 is provided as a sight hole to facilitate the insertion of the screw 28 through the threaded bore in the member 20. After the member 22 is mounted to the steering column the switch case 4 is attached thereto by screws 30.

Riveted to the base plate 12 are the brass contact strips 44, 46, 48 and 50, the contact members 51 and 52, and the bracket 32. The bracket 32 is affixed to the base plate by rivets 34 and contains a centrally located bore 38 in alignment with the bore 40 in the switch assembly base plate 12. Rotatably mounted in the bores 38 and 40, as hereinafter described, is the switch shaft 42.

The uppermost portion of the shaft 42 is of reduced diameter providing a mounting for the bracket 64 which is held on the shaft 42 by the screw 66. The operating lever 68 is slidably mounted in the bore 70 in the shaft 42 and in the bore 72 in the turned down portion 86 of the bracket 64. The operating lever 68 passes through the elongated slot 80 in the switch case 4 and provides a handle for convenient operation of the switch. The screw 74 which is threaded through the bracket 64 bears against the lever 68 locking it in position, preventing it from being withdrawn from the bores 70 and 72. It will be evident that the rod may be moved inwardly or outwardly of the switch case within the limits provided between the shaft 42 and the turned down portion 82 of the bracket 64. Thus the end portion 84 of the operating lever 68, which is provided to be gripped by the operator, may be positioned to his convenience.

The turned down portion 86 of the bracket 64 is elongated and curved and forms a close off plate back of the elongated slot 80 in the switch case 4.

The insulating member 54 is made of a resin impregnated fibre or other suitable insulating material and contains a central bore which is pressed over the reduced diameter serrated portion 58 of the switch shaft 42 and bears against the shaft shoulder formed thereby. The insulating member 54 is thus rigidly mounted to the switch shaft 42 and turns when the shaft is rotated. Attached to the insulating member 54 by rivets 53 is the metal plate 55, which has contact finger extensions formed by diagonal bends, as shown at 56 and 57, and is made of brass or other suitably conductive material having spring qualities. The contact finger extension 56 bears against the stationary contact strip 44 and the finger 57 bears against the contact strips 46, 48 or 50 as the switch is moved to various operating positions. It will be evident that the diagonal bend in the contact finger provides a contact surface which slides somewhat sideways over the stationary contacts as the switch shaft is rotated, providing what is effectively a wider sliding surface thereby reducing the wear and, yet, still retaining essentially the line contact which is the desirable construction for electrical contact surfaces.

Figure 2:
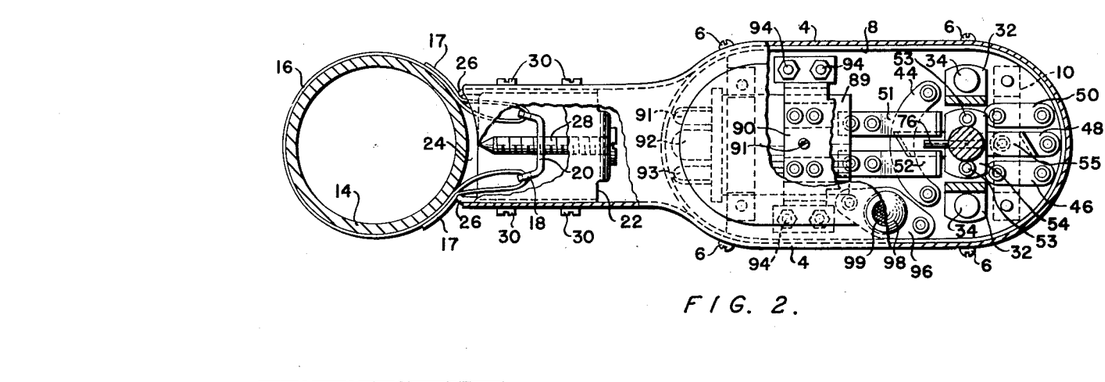
Figure 2 is a plan view of the switch assembly taken with the switch case partly cut-away showing the section taken on the plane indicated by the trace 2—2 in Figure 1.

The downward pressure provided by the bracket 32 bearing on the shoulder formed by the reduced diameter upper portion of the shaft 42 provides the necessary pressure which acts through the shaft 42 and the insulating member 54 to cause the contact flexible fingers 56 and 57 to bear firmly against the stationary contact plates 44, 46, 48 and 50. Also mounted in the shaft 42 is the pin 76 which assumes a position between the contact member 51 and 52 when the switch is in the neutral position as shown in Figure 2 and is adapted to contact either the member 51 or 52 when the shaft 42 is rotated to an operating position.

Attached to the base plate 12 by the bolts 94 is the bracket 90 in which is threaded the set screw 91. The bracket 90 and the set screw 91 retain the case 88 in which is mounted a flasher and relay assembly. The flasher and relay assembly case 88 is covered by a layer of insulating material 89 which is of a fiber or other suitable insulating material to prevent grounding of the contact members 51 and 52 by contact through the flasher case 88 and flasher mounting bracket 90. The flasher and relay assembly may be of the type disclosed in the patent to Schmidinger No. 1,979,349 and provided with an auxiliary contact, or a similar flasher of suitable operating characteristics as will be hereinafter described. Extending outwardly from the base of the flasher case 88 are three connection lugs 91, 92 and 93. In the interest of clarity, wiring has been omitted from the Figures 1, 2 and 3. The interconnection wiring of the switch assembly contacts and the flashed contact lugs will be evident from the electrical diagram shown in Figure 13.

Also riveted to the base plate 12 is the pilot light lamp socket 96 in which is mounted the pilot light lamp 98. Mounted in the top of the switch case directly above the pilot lamp 98 is the transparent jeweled element 99 which is so positioned as to be in the view of the operator.

Riveted to the top surface of the member 64 by means of the rivets 200 is the member 202 having the turned up wing extensions 204.

The scissors members 208 and 210 are provided with bores 211 and 212 which are mounted on a reduced diameter upper portion of the shaft 42 and rest on the shoulder 206 formed thereby. The right hand ends of the scissors members are provided with the upturned ears 213 and 214 which are adapted to engage the bracket member 32. The left hand ends of the scissors members 208 and 210 mount the tension spring 216. The scissors members 208 and 210 are also provided with the upturned portions 217 and 218, respectively, which are provided with the extensions 219 and 220, respectively.

The bimetallic elements 222 and 224 are mounted to the top portion of the bracket 90 by means of the rivets 226 and 228. The set screws 230 and 232 are provided to adjust the positions of the bimetallic elements as will be hereinafter described.

Mounted on each of the bimetallic elements 222 and 224 are two slotted elements 233 which are made of ceramic or other suitable heat resistant insulating material. The elements 233 provide mountings for the heating coils 234 and 236. The bimetallic elements are reduced in width between the ceramic elements 233 as shown at 231 to a width slightly less than the spacing between the ceramic elements. Thus the bimetallic elements are permitted to bend freely in a generally curved form when they are heated and the relatively stiff brittle ceramic elements are permitted to retain their normal straight form when the bimetallic elements bend.

Affixed to the upper surfaces of the bimetallic strips in the space between the coil mounting elements 233 are strips 237 of asbestos or other suitable heat insulating material. The heat insulating strips 237 prevent the bimetallic elements from being heated on their top surfaces by the heating coil to the same degree as they are heated on their bottom surfaces. This differential in heating serves to provide a greater deflection in the bimetallic element than would normally occur if the both surfaces of the element were heated uniformly. The ceramic coil mounting elements 233 serve not only to insulate the coil windings from the bimetallic elements but also permit more free circulation of air through the coil windings thus accomplishing a more rapid cooling of the heating coil and element after the heating coil is deenergized.

When the switch operating lever 84 is in the position shown in Figures 1–4, the switch is in what will be hereinafter referred to as the neutral position. The switch is held in this position by the action of the tension spring 216 pulling together the left hand ends of the scissors members 208 and 210 and by the action of the upturned portions 217 and 218 of the left hand ends of the scissors members bearing against the sides of the left hand end of the member 64.

Figure 13:
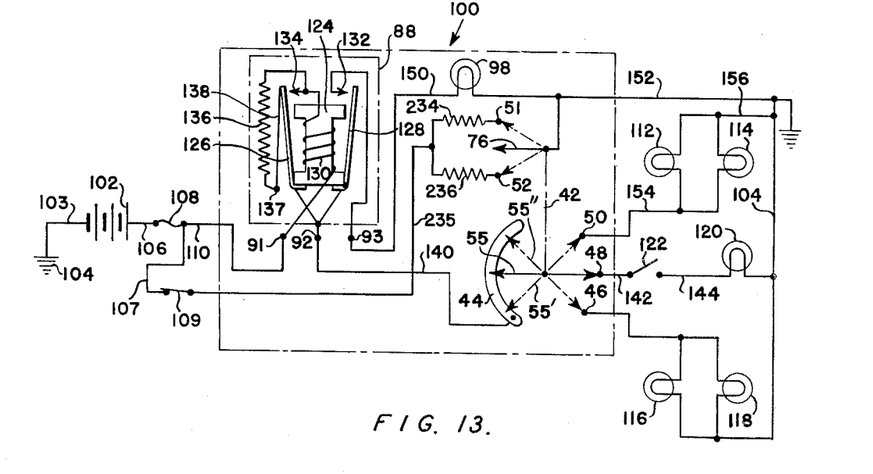
Figure 13 is a diagrammatic showing of the electrical circuit employed in all forms of the invention.

Referring to Figure 13 showing the electrical circuit employed in the present invention there is shown generally at 100 the wiring diagram of the control switch assembly including within the outline 88 the flasher and relay assembly having connection points 91, 92 and 93 and which will be hereinafter described in detail. Also included within the switch assembly is the pilot light 98, the switch contact arm 55 and its associated contacts 44, 46, 48 and 50, and the grounded pin 70 in the switch shaft 42 and its associated contact members 51 and 52, the contact members 51 and 52 being connected respectively to the heating coils 234 and 236. Both the arm 55 and the pin 70 are affixed to the switch shaft 42 as has been previously described.

The battery 102 which is generally the battery included in the electrical system of the motor vehicle on which the signal system is installed, is grounded in the conventional fashion through conductor 103 to ground 104, the other side of the battery is connected through lead wire 106, fuse member 108 and lead wire 110 to the connection point 91 of the flasher and relay assembly.

The signal lamp circuits include the front and rear right hand turn signal lights 112 and 114, respectively, the left hand front and rear turn signal lights 116 and 118, respectively, the rear stop light 120, and at 122 a conventional stop light control switch which operates from the vehicle braking system. The flasher and relay assembly comprises an armature member 124 around which is wound the armature coil 130 and on which is mounted the movable contact arms 126 and 128. The flasher operation is controlled by the current limiting resistor 136 and the thermal element 138 which are made of a high resistance heat resistant wire. The normal spring action of the flexible contact arm 126 urges the arm to move toward the armature and to contact the contact 134. However, the thermal element 138 extending between the arm 126 and the fixed point 137 holds the arm 126 away from the contact 134.

When a potential is applied across the connection points 91 and 92 a current will flow through the armature coil 130, resistance 136, thermal element 138 and through the arm 126 to the connection point 92. This current flow is limited by the current limiting resistor 136 to a value which will not produce sufficient magnetic field to cause the flexible contact arm 128, which is held in open position by its own spring action, to be drawn against the armature 124. The current is sufficient, however, to heat the thermal element 138 which, upon heating expands, thus allowing the contact arm 126 to move inwardly gradually and, after a period of time, preestablished for the value of potential applied, to make contact with contact 134. When this contact is made the current flow will increase to a value determined by the capacity of the lamps in the circuit, and the increased current flow through the armature coil 130 will produce a sufficient magnetic field to hold the contact arm 126 firmly against the armature 124 and also may, as will be hereinafter described, cause the contact arm 128 to close against the armature 124 and contact 132.

When the contact arm 126 engages contact 134 the high resistance 136 and the thermal element 138 are bypassed reducing the current through the thermal element to essentially a zero value, thus permitting the thermal element to cool and contract. When the tension developed in the thermal element by contraction therein is sufficient to overcome the magnetic effort of the armature field the movable arm 126 will be drawn away from the armature 124 opening the contact 134. The current limiting resistor 136 and the thermal element 138 are thus again included in the circuit and another period of heating is begun during which time only a limited current will flow through the circuit. During this period of limited current flow through the coil 130 the contact arm 128 will by its own spring action be drawn from the armature 124 and the contact 132 will be open.

With the switch operating lever in the position shown in the Figures 1–4 the movable switch arm 55 will be in the position connecting contact points 44 and 48, as shown in Figure 13. With the switch in this position an operation of the stop light switch 122, which will occur in a conventional fashion in conjunction with an operation of the vehicle braking system will establish a circuit permitting current to flow from the battery 102, one side of which is grounded at 104, through the lead wire 106, fuse member 108, lead wire 110, armature coil 130, current limiting resistor 136, thermal element 138, contact arm 126, lead wire 140, signal switch parts 44, 55 and 48, lead wire 142, stop light switch 122, lead wire 144, and stop light lamp 120 to the common ground 104.

Due to the high resistance of the path through the limiting resistor 136 and the thermal element 138, insufficient current will pass to illuminate the lamp 120. The current is sufficient, however, to heat the wire 136. The heated wire expands allowing the contact arm 126 to move inwardly toward the armature 124 and to ultimately make contact with the contact point 134. When this contact is established the resistor 136 and the thermal element 138 are bypassed and a low resistance circuit is established through the flasher, and the current flow is dependent upon the resistance of the lamp member 120.

The current which flows through the armature coil 130 when the lamp 120 is illuminated creates a magnetic field in the armature 124 of sufficient intensity to close contact member 128 against the contact point 132 thereby closing the circuit between connection points 92 and 93 permitting current to flow from the battery 102 to contact point 92 as has been previously described and from connection 92 to connection point 93, through connecting wire 150, the lamp 98 and through wire 152 to the common ground 104.

The stop lamp 120, the turn signal lamps 112 and 114, and the turn signal lamps 116 and 118 are selected to be of such capacity that each of the three circuits normally draw the same amount of current when all the lamps are operative. The spring tension of the contact arm 128 of the flasher assembly is selected to be such that a current less than the normal current through any of the signal circuits will not produce a field of sufficient intensity in the armature 124 to pull in the arm 128 and close the contact 132. Thus failure in any of the lamp circuits will cause the pilot light to become inoperative and thereby provide for the operator an immediate indication of any failure in the signal system.

As has been hereinbefore described, upon the closing of the contact arm 126 against contact point 134 substantially no current will flow through the resistance 136 and the thermal element 138. Thus, the thermal element will cool and contract and, when sufficient tension has developed, will draw the contact arm 126 away from the armature 124 breaking the contact at 134 and again imposing into the circuit the resistance 136 and the thermal element 138 thus limiting the flow of current through the circuit to a value below that which is required to illuminate the lamp 120.

This reduced current value through coil 130 is immediately followed by a reduction in magnetic field whereupon the contact arm 128 will drop out, opening contact 132, interrupting the current through the pilot lamp. After a heating interval the thermal element 136 will again have expanded sufficiently to allow the contact arm 126 to move inwardly making connection with contact 134 and the above described operation is repeated. Thus there exists a flasher system which, so long as a circuit is completed to ground, will continue to operate and if the current passing through the coil 130 is above the value required to create sufficient magnetic field to close the contact member 128 against its own spring tension, the member 128 will close and open in conjunction with the flashing operation of the flasher, thus causing the pilot light to blink simultaneously with the blinking of the signal lamp.

Figure 5:
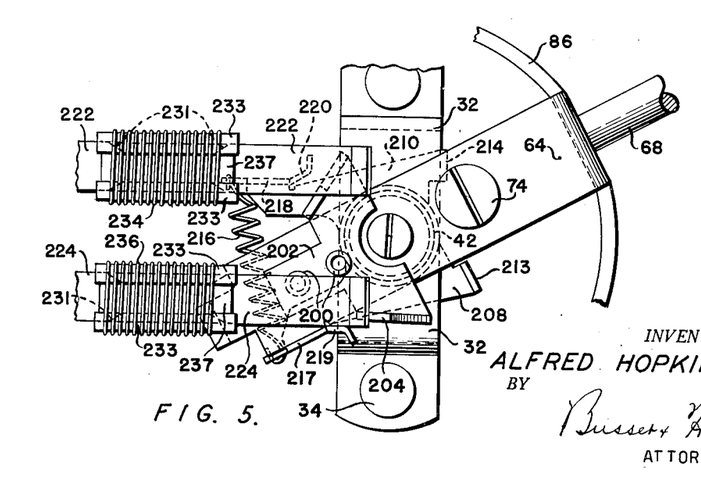
Figure 5 is an enlarged showing of the same portion of the switch mechanism as shown in Figure 4 with the switch latched in an operative position.

When the operating lever 68 is moved by the operator to a position to indicate, for example, a right hand turn as shown in Figure 5, the movable switch member 55 will assume a position 55' shown in construction lines in Figure 13 connecting the contact 44 with the contact 50. In this position of the signal switch the current flow from the battery 102 through the fuse 108 and the flasher assembly, as hereinbefore described, connecting wire 140, contact member 44, 55' and 50, the wire 154 and to the right hand front and rear signal lamps 112 and 114, respectively, to the common ground 104. It will be evident that the turn lights 112 and 114 will cause the flasher to operate in a manner identical to that as described in connection with the operation of the stop light 120.

When the operating lever is moved to a position to indicate a left-hand turn the switch member will assume the position shown by 55'', the left-hand turn lamps 116 and 118 will be energized and the system will operate as described above in connection with the right-hand turn lights.

It should be noted that when the signal switch member 55 is in the position of contacting either contact member 50, in the case of a right hand turn, or contact member 46, in the case of a left hand turn, that a simultaneous operation of the stop light switch 122 will not cause a current to flow through a stop light 120 because of the fact that there is an open circuit between contact members 44 and 48.

Referring to Figure 5 it will be observed that when the operating lever is moved upwardly to a turn position as described above, scissors member 208 will be rotated about the shaft 42 as a result of the engagement of the turned up portion 217 of the scissors member 208 with the side of the left hand end portion of the member 64. When the member 64 and the scissors member 208 have been thus positioned the right hand end of the thermal element 224 as a result of its own spring force will move downwardly as the extension 219 of the upturned portion 217 of the member 208 moves out from underneath the thermal strip. When the parts have assumed these positions, it will be observed that the spring 216 has been expanded and is acting to pull the left hand end of the scissors members together, and by virtue of the engagement of the upturned portion 217 of the scissors member 208 with the member 64 the spring 216 also serves to provide a force urging the member 64 to return to a neutral position. The return of the scissors member 208 to the neutral position is prevented by the thermal element 224 the edge of which is in engagement with the side of the extension 219 of the upturned portion 217 of the scissors member 208. Return of the member 64 to the neutral position is resisted by the engagement of the end of the thermal element 224 with the inclined edge of the upturned portion 204 of the member 202.

Figure 3:
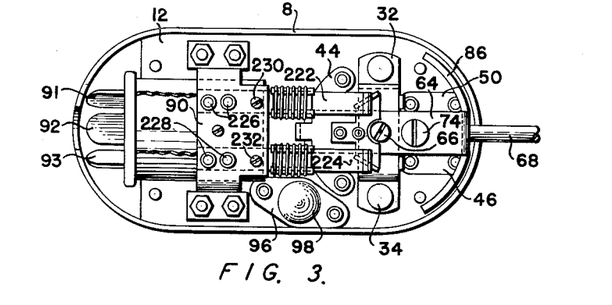
Figure 3 is a plan view of the switch assembly shown in Figure 1 with the switch case removed.
Figure 4:
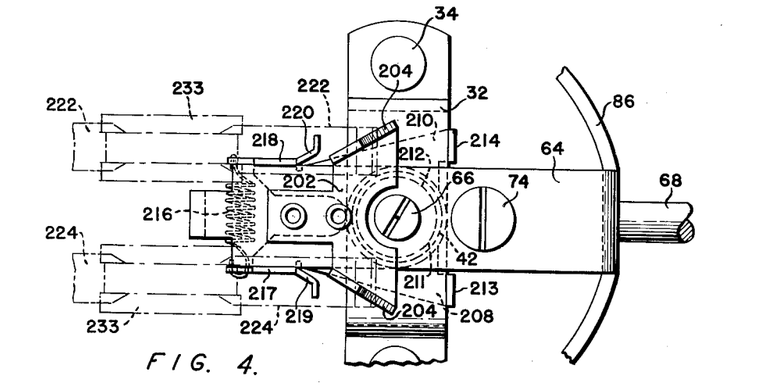
Figure 4 is an enlarged showing of a portion of the switch mechanism shown in Figure 3 with the switch in a neutral position.

It will be noted that the adjusting screws 230 and 232 shown in Figure 3 provide means for adjusting the positions of the right hand ends of the thermal elements to provide for proper engagement of the members 219 and 220 by the thermal elements.

Manual return of the switch assembly to the neutral position may be accomplished by the operator drawing the operating lever downwardly to the neutral position causing the inclined edge of the winged extension 204 of the member 202 to cam the thermal member upwardly and to pass under the thermal element to the neutral position. After the thermal element has been lifted sufficiently by the portion 204, the extension 219 of the upturned portion 217 of the scissors member 208 is permitted to pass below the thermal element in response to the urging of the spring 216 and again contact the side of the left hand end of the member 64 urging it to assume the neutral position shown in Figure 4.

Automatic return of the switch assembly to the neutral position from an operating position after the expiration of a predetermined period of time is accomplished by the operation of one of the thermal elements. When the operating lever has been moved upwardly as shown in Figure 5 the pin 76 which is grounded to the switch shaft 42 engages the contact member 52 closing the circuit from the battery 112, through the conductor 107, fuse 108, conductor 187, switch 109, conductor 235 and the heating coil 236 to ground through the pin 76 and the switch shaft 42.

When the heating coil 236 is energized the heat generated in the coil will heat the bimetallic element 224 and, as a result, the right hand end of the bimetallic element will be deflected upwardly. When the deflection of the bimetallic element is sufficient to lift the end of the element above the extension 219 of the turned up portion 217 of the scissors member 208, the scissors member 208 is free to respond to the urging of the spring 216 and return to the neutral position carrying with it the member 64. The parts will then assume the position shown in Figures 1-4.

The switch 109 may be variously positioned for convenient operation, for example, on the floor of the car where it may be foot-operated and serves to permit the driver to open the heating coil circuit when he desires to extend the time interval during which the turn signal lamps will remain energized. The switch 109 is a normally closed switch and, therefore, when not held in open position by the driver the turn signal switch will be controlled by the normal operation of the heating elements and thus the turn signal system cannot be rendered inoperative by forgetfulness on the part of the driver.

It will be observed that, if immediately following the automatic release of the switch assembly from the operating position, as shown in Figure 5, the switch is manually turned to the opposite operating position, the bimetallic strip 222 will engage the extension 220 of the turned up portion 218 of the scissors member 210 and serve to retain the switch assembly in the other operating position. When the switch has been placed in this position the heating coil 234 is energized as a result of the completion of the circuit therethrough by the grounding of the contact member 51 by the pin 76. When the bimetallic element 222 is heated sufficiently by the coil 234 to have deflected its right hand end portion upwardly above the extension 220 of the turned up portion 218 of the scissors member 210, the portion 218 of the scissors member 210 will return the member 64 to the neutral position as a result of the urging of spring 216. It will be observed that immediately following an automatic return of the switch from one operating position the switch may be placed in the other operating position and an automatic return therefrom be effected.

Figure 6:
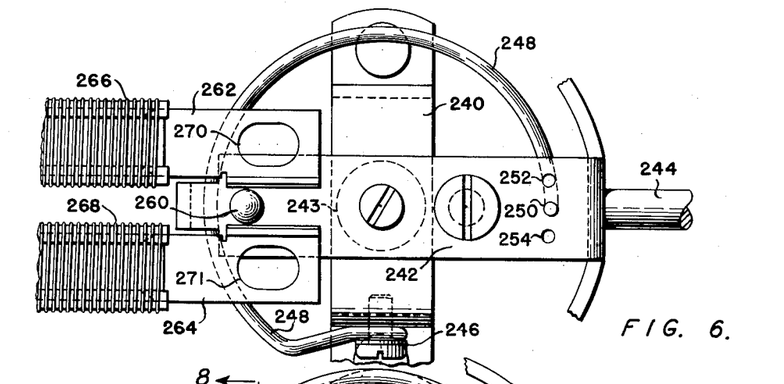
Figure 6 is an enlarged showing of an alternate form of the portion of the invention shown in Figure 4 showing the switch in a neutral position.
Figure 7:
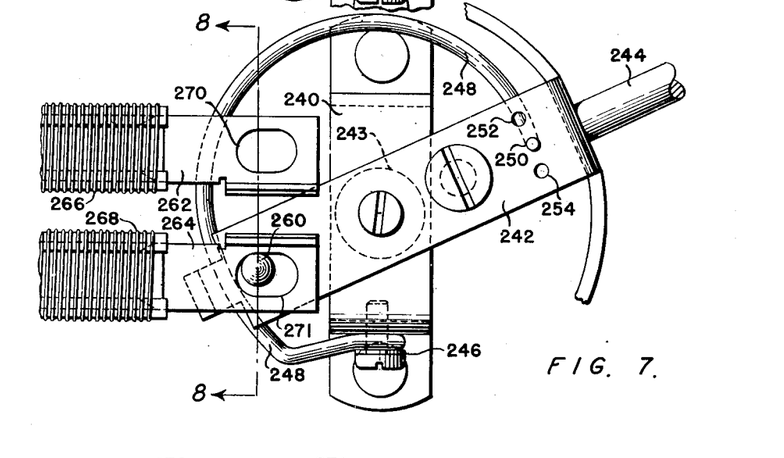
Figure 7 is an enlarged showing of the portion of the alternate form of the invention shown in Figure 6 with the switch latched in an operative position.
Figure 8:
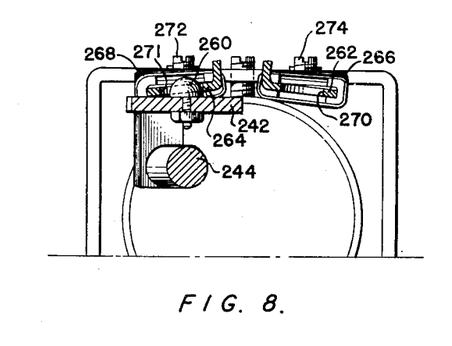
Figure 8 is a section taken on the plane 8—8 in Figure 7.

In Figures 6, 7 and 8 there is shown an alternate form of the invention employing a bracket 240 identical with the bracket 32 shown in Figures 1-5, and a member 242 and an operating rod 244 which are substantially identical to the member 64 and the operating rod 68 shown in Figures 1-5. Mounted on the left-hand end of the member 242 is the ball projection 260. The spring element 248 is mounted on the bracket 240 by means of screw 246 which is passed through a loop in the end of the spring wire. The other end of the spring 248 is provided with a turned up end portion which passes through the bore 250 in the member 242. The curved portion of the spring 248 is of such a form that the spring is at rest when the switch is in the neutral position shown in Figure 6. The bores 252 and 254 are provided for alternate reception of the turned up end portion of the spring to accommodate for reasonable manufacturing tolerances in the formation of the spring. Thus, by inserting the upturned end of the spring in one of the three holes 250, 252 or 254 the switch assembly will be in substantially the neutral position shown in Figure 6 when the spring is in a relaxed position. It will be apparent that moving the switch to the operating position shown in Figure 7 or to the opposite operating position will deflect the spring and while the switch is held in that position the spring will act to urge the switch assembly to a neutral position.

In this form of the invention the bimetallic elements 262 and 264 are mounted substantially identically as are the elements 222 and 224 shown in Figures 1-5 and have mounted thereon the heating coils 266 and 268 which are substantially identical to the heating coils 234 and 236 previously shown. In the form of the invention shown in Figures 6, 7 and 8, however, the right hand end portions of the bimetallic elements 262 and 264 are inclined upwardly towards each other as is clearly shown in Figure 8 and are also provided with the apertures 270 and 271, respectively.

When the switch, constructed in accordance with this form of the invention, is moved to an operating position, for example, as shown in Figure 7, the ball member 260 passes beneath the bimetallic element 264 forcing the element upwardly until the ball enters the aperture 271 in the element. The normal spring tension in the bimetallic element tends to hold the element down in a position with the aperture surrounding the ball thus retaining the ball within the aperture and retaining the member 242 in the operating position.

Thus when the operating rod 244 is moved upwardly as shown in Figure 7 there is existing the tension of the spring 248 tending to pull the member 242 back to a normal position and the restraining action of the bimetallic element engaging the ball member 260 preventing the return of the member 242 to the neutral position.

After the switch has been moved to the operative position as shown in Figure 7 it will be apparent that if the operator exerts sufficient force upon the lever 244 the inclined surface of the ball member 260 acting on the edge of the aperture 271 will force the bimetallic element 264 upwardly and the ball will pass out of the aperture as the member 242 is moved to neutral position. The spring 248 will hold the member 242 in the neutral position as shown in Figure 6.

When the switch assembly has been manually placed in the operating position as shown in Figure 7 the heating coil 268 will be energized by the completion of the electrical circuit therethrough in a similar manner and by similar means as hereinbefore described in connection with the energizing of the heating coil 236. The bimetallic element is arranged so that when the heating coil 268 has been energized and the bimetallic element is heated thereby the element will deflect upwardly as its temperature is increased. When the element 264 has deflected upwardly to a sufficient extent to permit the ball member 260 to be drawn out of the aperture 271 by the force of the spring 244 acting on the member 242, the switch assembly will be returned to the neutral position.

It will be apparent that in this form of the invention, as in the previous form, the switch assembly may be moved to either of the operating positions and manually removed therefrom, or the switch assembly may be moved to either of the operating positions and after a predetermined period of time, as determined by the rate of heating of the bimetallic element provided by the heating coil, will be automatically released therefrom. In this form of the invention, as shown in Figure 8, there are provided adjusting screws 272 and 274 identical to the screws 230 and 232 hereinbefore described and by which the positions of the right hand ends of the thermal elements 264 and 262, respectively, may be positioned to provide for proper engagement of the ball member 266 by the edges of the apertures 270 and 271.

Figure 9:
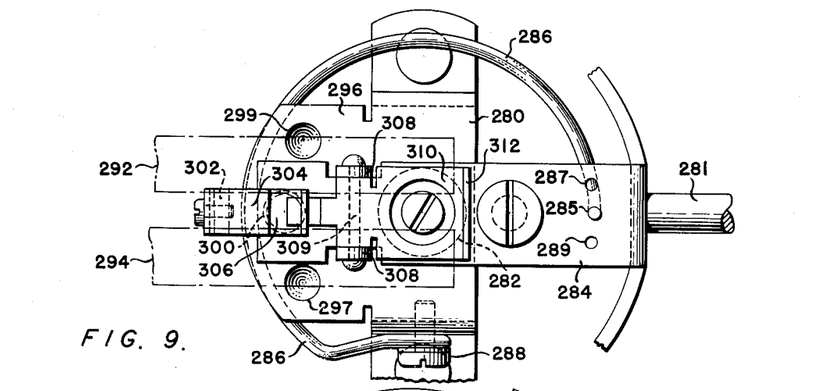
Figure 9 is an enlarged showing of another alternate form of the portion of the invention shown in Figure 4 showing the switch in a neutral position.
Figure 10:
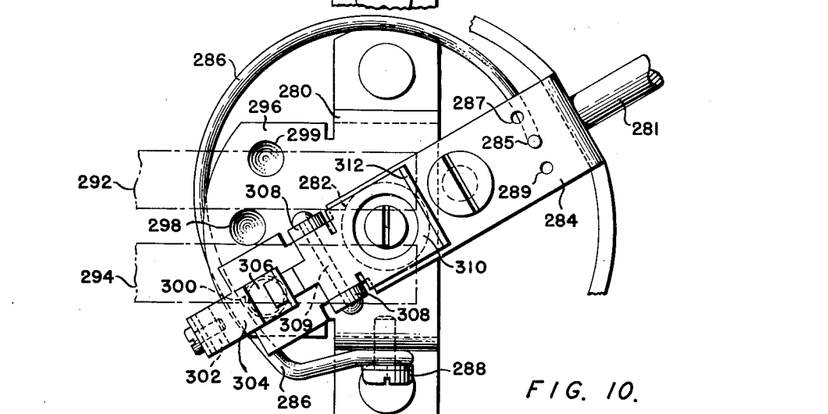
Figure 10 is an enlarged showing of the portion of the alternate form of the invention shown in Figure 9 with the switch latched in an operative position.
Figure 11:
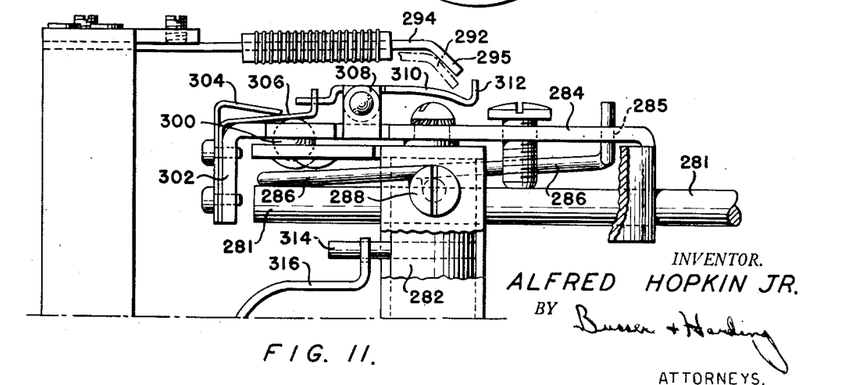
Figure 11 is a partially cut-away side elevation of the portion of the alternate form of the invention shown in Figure 9.

In the form of the invention shown in Figures 9, 10 and 11 there is provided the bracket member 280 which is similar to the bracket member 32 previously described herein except that in this form of the invention the top portion of the bracket 280 is provided with a flat extended portion 296 within which is formed depressions 297, 298 and 299. The bracket 280 mounts the switch shaft 282, the member 284 mounting the operating lever 281.

The spring member 286 is mounted to the bracket 280 by means of the screw 288 which is passed through a loop in the end of the spring. The other end of the spring 286 is provided with a turned up portion which is passed through the bore 285 in the member 284. There is provided the alternate bores 287 and 289 to accommodate normal manufacturing tolerances of the spring to permit the parts to be assembled with the switch assembly in a substantially neutral position when the spring member is at rest. The structure and operation of the spring in this form of the invention is substantially identical to that described in connection with the form of the invention shown in Figures 6 and 7.

In the form of the invention shown in Figures 9, 10 and 11 the bimetallic elements 292 and 294, which are shown in construction lines in Figures 9 and 10 to permit greater clarity of the showing of the other portions of the figures, are similar to those hereinbefore described in connection with the previous forms of the invention and mount heating coils which are identical to those hereinbefore described in connection with the previous forms of the invention. The right hand ends of the elements are bent downwardly as shown at 295 and the elements are adapted to bend downwardly when their associated heating coils are energized and the elements are heated thereby.

The left hand end of the member 284 contains an aperture within which is mounted the ball 300 and attached to the turned down portion 302 of the left hand end of the member 284 are the leaf spring members 304 and 306. As clearly shown in Figure 11, the spring member 306 engages the top of the ball 300 serving to press the ball downwardly against the plate 296 and to hold it in position in one of the depressions 297, 298 and 299 into which it may fall as a result of operation of the switch assembly.

Pivotally mounted to the turned up portions 308 of the member 284 by means of the pin 309 is the release member 310 being formed at its right hand end portion, as viewed in Figure 11, with a downward bend terminating with the upturned end portion 312. The left hand end of the member 310 passes through an opening in the upturned right hand end of the member 306.

In this form of the invention when the switch assembly is moved to an operative position, for example, as shown in Figure 10, the urging of spring 286 tends to return the member 284 to the neutral position. However, when the switch assembly is in this position the ball 300 is seated in the depression 297 and held therein by the member 306 with sufficient force to prevent the return of the member 284 to the neutral position. When the switch is in this position the heating coil (not shown) on the bimetallic element 292 is energized as a result of the contact established between the pin 314 and its associated contact member 316 which serves to establish a circuit through the heating coil in the same manner as the circuit was established through the heating coil 236 in the form of the invention first described. It will be observed by viewing Figure 10 that when the switch is in this position the right hand end of the bimetallic strip 292 terminates above the turned up portion 312 of the member 310. With the parts thus positioned when the bimetallic strip 292 is deflected downwardly as a result of being heated by its associated heating coil that the right hand end of the bimetallic strip will press downwardly the right hand end of the member 310 and lifting the member 306 from engagement with the ball 300 and thus permitting the ball 300 to rise out of the socket 297 and permitting the member 284 to be drawn to the neutral position as a result of the urging of the spring 286.

In Figure 11 there is shown in construction lines the right hand end of the thermal element 292 in the position it would assume when heated and deflected downwardly. It will be observed that the downward bend in the member 310 provides clearance permitting the switch to be locked in the neutral position by the action of the member 306 pressing the ball 300 into the depression 298 and also provides sufficient clearance in order to permit the switch to be turned into the other operating position bringing the end of bimetallic strip 294 over the upturned end 312 of the member 310 without there being engagement between the depressed end of the bimetallic strip 292 and any portion of the member 310.

Figure 12:
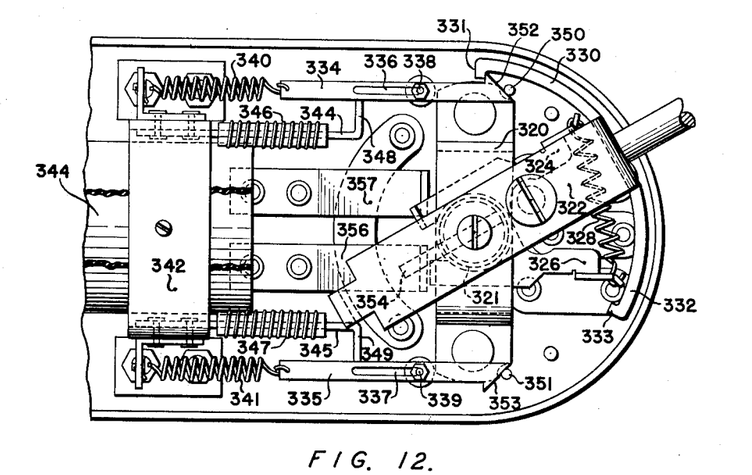
Figure 12 is a plan view of a portion of the switch assembly showing still another form of the invention.

Referring to Figure 12 there is shown still another modification of the present invention in which the bracket 320 mounts the switch shaft 321 which mounts the member 322 and the scissors members 324 and 326. The spring 328 is connected to the right hand ends of the two scissors members and is adapted to draw the ends together. These scissors members are identical to those described in connection with the form of the invention shown in Figures 6, 7 and 8.

In this form of the invention the member 324 carries the extended portions 330 and 332 are similar to the extended portions 86 shown in the first form of the invention hereinbefore described. In this form of the invention, however, the end of the member 330 is provided with the hook portion 331 and the end of the extension 332 is provided with the hook portion 333. There are also provided the sliding latch members 334 and 335 which contain the slots 336 and 337, respectively, and are thereby slidably mounted on the pins 338 and 339. The latch members 334 and 335 are held in position by the action of the tension springs 340 and 341 both of which are fixed to brackets mounted to the member 342. Member 342 serves to retain the flasher element 344 which is identical to element 88 as hereinbefore described. The member 342 also mounts the bimetallic strips 344 and 345.

The bimetallic elements 344 and 345 mount the heating coils 346 and 347, respectively, in a manner substantially identical to the mounting of the heating coils hereinbefore described in the other forms of the invention. The right hand ends of the bimetallic elements 344 and 345 as viewed in Figure 12 are provided with the outwardly turned portions 348 and 349, respectively, which are adapted to engage the latch members 334 and 335, respectively, as will be hereinafter described. There are also provided the stop pins 350 and 351 which engage the inclined end surfaces 352 and 353, respectively, of the latch members 334 and 335.

When the switch constructed in accordance with this form of the invention is moved to the operating position as shown in Figure 12 the hooked end portion 331 of the member 330 rides over the inclined end surface 352 of the latch member 334 depressing the end of the latch inwardly pivoting the latch member about the mounting pin 338. When the hooked end 331 has passed beyond the end surface 252 the latch member 334 acting in response to the tension applied by spring 340 will resume its normal position which is shown in Figure 12. In this position the hooked portion 331 of the member 330 is in engagement with the catch formed by the end of the inclined surface 352 of the latch member 334. It will be apparent that by providing a spring 340 of sufficient tension the member 322 is prevented from being returned to the neutral position, as a result of the urging of the spring 328 acting on the member 322 through the scissors member 324 on the member 322.

In this form of the invention when the switch is manually returned to the neutral position the hooked end 331 which is in engagement with the end of the latch member 334 will pull the latch member 334 to the right extending the spring 340 and causing the inclined surface 352 to be cammed inwardly as it slides past the stop pin 350. When the latch member 334 is pulled to the right a sufficient distance and caused to rotate about the mounting post 338 as a result of the camming of the surface 352 against the stop pin 350, it will be apparent that the hooked end portion of the latch member 334 will be drawn clear of the hooked end portion 331 of the member 330 permitting the member 322 to be returned to the neutral position and permitting the latch member 334 to be returned to its normal position by the action of the spring 340.

When the switch assembly has been placed in the operating position as shown in Figure 11 the pin 354 on the switch shaft will engage the contact member 356 and will close the circuit through the heating coil 346 in the same fashion that the heating coil circuit was completed in the form of the invention first described. In this form of the invention the bimetallic element 344 is adapted to deflect outwardly as it is heated by the heating coil 346 and bear against the latch member 334 causing the latch member 334 to rotate about the mounting pin 338. When the bimetallic element 344 has deflected outwardly to a sufficient degree to cause the hooked end of the latch member 334 to release the hooked end 331 of the member 330 the member 322 and the switch assembly will be returned to the neutral position as a result of the tension spring 338 acting through the scissors member 324 on the member 322.

It will be observed that in this form of the invention there is provided a latch member 335 and its associated parts adapted to latch the switch assembly in its other operating position and a bimetallic element 335 and its associated parts adapted to automatically release it therefrom independently of the condition of deflection of the bimetallic element 344.

It will be apparent that the present invention provides, as set forth in the various embodiments, an automotive signal system switching mechanism having an automatic return from its normally operative positions to its neutral position. The automatic return is completely independent of the operation of the motor vehicle, for example, the turning of the steering wheel is sometimes used to effect the return and it is independent of the operator.

It will also be noted that in all forms of the invention disclosed herein the thermally actuated release mechanisms associated with each of the signal switch operating positions are independent of each other in their operation. This is of considerable importance in view of the fact that an operator after having placed the switch in one operating position may desire immediately thereafter to place the switch in the other operating position. It will be apparent that in all forms of the invention, as hereinbefore set forth, this is permissible even though the thermal element associated with the position in which the switch was first placed may have been heated to a substantial degree and was about to or had actually released the latching mechanism holding the switch assembly in that position.

The invention as disclosed herein contains various other novel features such as the mounting of the heating coils on the bimetallic elements and the application of the heat insulating strip of the material on one side of the bimetallic element. The employment of the heat insulating strip in this structure provides for a maximum degree of deflection of the bimetallic element with a minimum temperature rise, and the spaced coil winding as provided by the porcelain members mounted on the bimetallic elements provides for the free circulation of air thus effecting the maximum possible rate of cooling of both the coil and the bimetallic element. Thus the bimetallic element will cool to a normal temperature, at which it will assume its normal at rest position, in a minimum period of time.

It will be apparent that the switch return spring arrangement shown in Figures 6–11 and the spring and scissors switch return mechanism shown in Figure 12 may be used interchangeably. It will also be apparent that various other modifications may be made in the form of the invention disclosed herein without departing from the scope of the invention as set forth in the following claims.

What is claimed is:

1. A time delay release control switch assembly comprising rotatable switching means having a plurality of contact positions, means for urging the switching means from one of its contact positions to another of its contact positions, means engaging and retaining said rotatable switching means in said one of its contact positions when it is rotated thereto, and thermally responsive means for releasing the engaging and retaining means to permit the urging means to rotate the switching means to said other of its contact positions.

2. A time delay release control switch assembly comprising a manually operated rotatable switching means having a plurality of contact positions, means for urging the switching means from one of its contact positions to another of its contact positions, means engaging and retaining said rotatable switching means in said one of its contact positions when it is rotated thereto, and thermally responsive means for releasing the engaging and retaining means to permit the urging means to rotate the switching means to said other of its contact positions after said switching means has been retained in said one of its contact positions for a predetermined period of time, said engaging and retaining means being releasable by manual rotation of said switching means to said other of its contact positions before the expiration of said predetermined period of time.

3. A time delay release control switch assembly comprising rotatable switching means having a plurality of contact positions, means for urging the switching means from one of its contact positions to another of its contact positions, means engaging and retaining said rotatable switching means in said one of its contact positions when it is rotated thereto, thermally responsive means for releasing the engaging and retaining means to permit the urging means to rotate the switching means to said other of its contact positions after said switching means has been retained in said one of its contact positions for a predetermined period of time, and means for extending said predetermined period of time.

4. A time delay release control switch assembly comprising rotatable switching means having a neutral position and an operative position on each side of said neutral position, means for urging the return of said switching means from each of its operative positions to its neutral position, independent means engaging and retaining said rotatable switching means in either of its operative positions when it is rotated thereto, and independent thermally responsive means for releasing the engaging and retaining means to permit the urging means to rotate said switching means from either of its operative positions to its neutral position.

5. A time delay release control switch assembly comprising rotatable switching means having a plurality of contact positions, means for urging the switching means from one of its contact positions to another of its contact positions, means engaging and retaining said rotatable switching means in said one of its contact positions when it is rotated thereto, means including a thermally responsive element for releasing the engaging and retaining means to permit the urging means to rotate the switching means to said other of its contact positions, coil mounting means mounted on said thermally responsive element, and a heating coil mounted on said coil mounting means in spaced relation with said element, said mounting means and said element being constructed and arranged to permit the element to bend substantially arcuately when heated by the heating coil while the coil mounting means retains its normal form.

6. A time delay release control switch assembly comprising rotatable switching means having a plurality of contact positions, means for urging the switching means from one of its contact positions to another of its contact positions, means engaging and retaining said rotatable switching means in said one of its contact positions when it is rotated thereto, means including a flat thermally responsive element for releasing the engaging and retaining means to permit the urging means to rotate the switching means to said other of its contact positions, coil mounting means mounted on said thermally responsive element, a heating coil mounted on said coil mounting means in spaced relation with both sides of said flat element, and means providing a greater degree of heating of one side of said flat element by said heating coil than of the opposite side of said flat element by said heating coil.

7. A time delay release control switch assembly comprising rotatable switching means having a plurality of contact positions, means supporting said switching means, means for urging the switching means from one of its contact positions to another of its contact positions, means engaging and retaining said rotatable switching means in said one of its contact positions when it is rotated thereto, and thermally responsive means for releasing the engaging and retaining means to permit the urging means to rotate the switching means to said other of its contact positions, said urging means comprising not more than one convolution of a single arcuately formed spring element joining said switching means and said supporting means.

8. A time delay release control switch assembly comprising rotatable switching means having a plurality of contact positions, means supporting said switching means, means for urging the switching means from one of its contact positions to another of its contact positions, means engaging and retaining said rotatable switching means in said one of its contact positions when it is rotated thereto, and thermally responsive means for releasing the engaging and retaining means to permit the urging means to rotate the switching means to said other of its contact positions, said urging means comprising a single arcuately formed spring element joined at its ends to said switching means and said supporting means, and means providing for the joining of one end of said spring element in alternate positions to provide adjustment of the urging applied to said switching means by the spring element.

9. A time delay release control switch assembly comprising rotatable switching means having a plurality of contact positions, supporting means pivotally mounting said switching means, means for urging the switching means from one of its contact positions to another of its contact positions, means engaging and retaining said rotatable switching means in said one of its contact positions when it is rotated thereto, and thermally responsive means for releasing the engaging and retaining means to permit the urging means to rotate the switching means to said other of its contact positions, said urging means comprising a pair of scissors members pivotally mounted on said supporting means and means urging said scissors members together, said scissors members being separated by rotation of said switching means from said other of its contact positions to said one of its contact positions.

10. A time delay release control switch assembly comprising rotatable switching means having a plurality of contact positions, means for urging the switching means from one of its contact positions to another of its contact positions, and means including pivotally mounted scissors members and a thermally actuated element for retaining said rotatable switching means in said one of its contact positions when it is rotated thereto, the thermally actuated element being operable to release the scissors members to permit the urging means to rotate the switching means to said other of its contact positions.

11. A time delay release control switch assembly comprising a manually operated rotatable switching means having a plurality of contact positions, means for urging the switching means from one of its contact positions to another of its contact positions, and means including a thermally actuated element for retaining said rotatable switching means in said one of its contact positions when it is rotated thereto and thereafter releasing the retaining means to permit the urging means to rotate the switching means to said other of its contact positions.

12. A time delay release control switch assembly comprising rotatable switching means having a plurality of contact positions, means for urging the switching means from one of its contact positions to another of its contact positions, means including a protrusion and a cooperating socket retaining said rotatable switching means in said one of its contact positions when it is rotated thereto, and thermally responsive means for releasing the protrusion from the cooperating socket to permit the urging means to rotate the switching means to said other of its contact positions.

13. A time delay release control switch assembly comprising rotatable switching means having a plurality of contact positions, means for urging the switching means from one of its contact positions to another of its contact positions, means including a member, a cooperating socket and means urging the member into the socket for retaining said rotatable switching means in said one of its contact positions when it is rotated thereto, and thermally operated means for relieving the member from the urging of the member urging means for releasing the retaining means to permit the switch urging means to rotate the switching means to said other of its contact positions.

14. A time delay release control switch assembly comprising a manually operated rotatable switching means having a plurality of contact positions, means for urging the switching means from one of its contact positions to another of its contact positions, means including a pivotally mounted latch retaining said rotatable switching means in said one of its contact positions when it is rotated thereto, and thermally operated means for releasing the retaining means to permit the urging means to rotate the switching means to said other of its contact positions.

ALFRED HOPKIN, Jr.

References Cited in the file of this patent
UNITED STATES PATENTS

| Number | Name | Date |
|---|---|---|
| 2,043,470 | Dyer et al. | June 9, 1936 |
| 2,264,027 | Holmes | Nov. 25, 1941 |